INVENTOR
WILLIAM G.S. SMITH
BY- Smart & Biggar
ATTORNEY

May 12, 1970     W. G. S. SMITH     3,511,123
TOP MOUNTING FOR ROTARY SLITTERS
Filed Nov. 20, 1967     3 Sheets-Sheet 3

INVENTOR
WILLIAM G.S. SMITH
BY- Smart & Biggar
ATTORNEYS

United States Patent Office 3,511,123
Patented May 12, 1970

3,511,123
TOP MOUNTING FOR ROTARY SLITTERS
William George S. Smith, P.O. Box 10, Topsail,
Corner Brook, Newfoundland, Canada
Filed Nov. 20, 1967, Ser. No. 684,342
Claims priority, application Great Britain, Feb. 7, 1967,
5,854/67
Int. Cl. B26d 1/24
U.S. Cl. 83—482                    5 Claims

ABSTRACT OF THE DISCLOSURE

A mounting for paired rotary cutters in which provision is made for movement of one of the cutters diagonally of its axis away from its adjacent cutter, and for precise loading of the movable cutter against its adjacent cutter, whereby loading of the cutters against each other may be precisely regulated and whereby radial clearance between the cutters may be provided to allow threading of a web between the cutters.

This invention relates to an improved mounting for the idling cutter in rotary shear cutters of the type used for cutting webs of sheet material such as paper.

Background of the invention

In conventional cutting machines of this type, there is often provided a cylindrical cutter having a lateral cutting edge and a disc-like idling cutter, slidably and rotatably mounted on an axis parallel to that of the cylindrical cutter, a portion of the edge of the disc cutter being kept in engagement with a portion of the lateral cutting edge of the cylindrical cutter. Usually, the cylindrical cutter is rotated, by an electric motor, and friction between the cylindrical cutter and the disc cutter rotates the disc cutter. The web is passed at high speed through the nip between the cylindrical and disc cutters, and is thereby sheared to a desired width.

It is necessary to provide means for adjusting the cutters relative to each other in order to provide for threading of the web to be cut into the cutters, wear of either or both of the cutters and for a greater or lesser overlap between the cutters for various cutting conditions. Usually, axial adjustment of the two cutters relative to each other has been carried out by moving the idler cutter axially toward the cylindrical cutter, and in some instances a spring has been provided on the shaft of the idler cutter to bias it axially toward the cylindrical cutter. Further, various means have been provided for moving the axes of the cutter closer together to adjust the overlap, and for adjusting the idler cutter so that it makes contact with the cylindrical cutter only at the ingoing nip, to provide shear.

A disadvantage of the above-mentioned type of slitter mounting is that three separate movements or adjustments of the idler cutter are necessary, i.e., the movement axially of the two cutters toward each other, the movement of the idler toward the axis of the cylindrical cutter, and the adjustment of the shear. A further disadvantage is that when wear takes place between the surface of the suporting axle and the base of the idler cutter it is free to wobble causing uneven wear and rough slitting. Still further, where the idler cutter is spring loaded against the lateral surface of the cylindrical cutter, any unevenness in the wear of either of the cutters will lead to bouncing of the idler towards and away from the lateral surface of the cylindrical cutter. Since the axial loading of the idler cutter against the cylindrical cutter can be critical, for accurate cutting and for minimizing cutter wear and damage, there is a need for great care in carrying out adjustments.

Summary of the invention

Accordingly, it is an object of the present invention to overcome the above disadvantages. Broadly stated, this invention comprises, in rotary shear cutters of the type comprising a pair of cutters rotatable on parallel axes and having lateral cutting edges, said cutters overlapping at their cutting edges to define a shear area, a frame mounting said cutters, and apparatus for adjusting said cutters relative to each other, said apparatus including a movable support for one of said cutters, and means mounting said support to said frame for compound movement of said one of said cutters axially toward the other of said cutters and transversely of said axis toward the other of said cutters. More particularly, the present invention may comprise flexible means attaching the support for the disc cutter to the frame, and means for urging said support, against a spring bias, toward the axis of the cylindrical cutter and laterally toward the lateral cutting edge of the cylindrical cutter. Still more specifically, said flexible means may include laminated metal members, connecting said support to the frame of the device. The means for urging the disc cutter toward the cylindrical cutter may include a bellows structure adapted to be extended by compressed air.

Brief description of the drawings

A particular embodiment of this invention will be described in the attached drawings, in which.

Description of the preferred embodiment

In the attached drawings only the invention and its associated parts have been described, since it is believed that the remaining structure of a rotary slitter apparatus is well known and does not warrant specific description.

Figure 1:
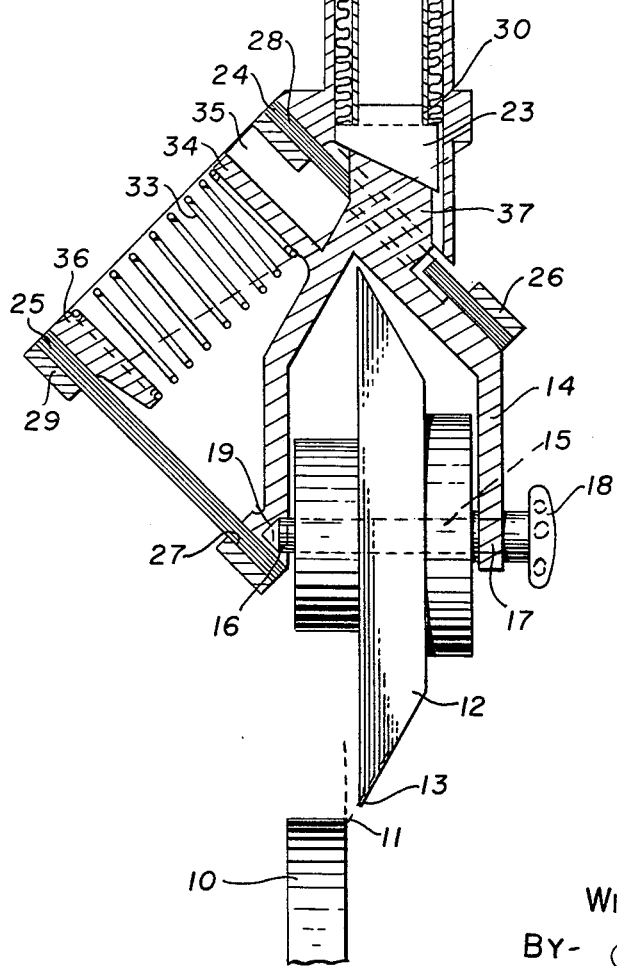
FIG. 1, partly in section, illustrates, the means of supporting the idler cutter of moving it obliquely toward the other cutter, and of holding it in contact without bouncing according to the invention.

There is shown in FIG. 1 a portion of a cylindrical cutter 10 having a lateral cutting edge 11. Mounted above the cylindrical cutter 10 is a saucer-like cutter 12, which also has a lateral cutting edge 13 adapted to contact and slightly overlap the cutting edge 11 of cylindrical cutter 10. The cylindrical cutter 10 is mounted for rotation about a horizontal axis (not shown).

The saucer-like cutter 12 is mounted in a support 14 and is rotatable about a pin or axle 15. In the present embodiment, the support 14 comprises a fork-like structure having two legs, the pin or axle 15 about which the cutter 12 is rotatable being attached to each of the legs at 16 and 17. The axle may comprise a hardened bolt, having a head 18, the bolt passing through a sleeve holding a pair of ball bearings (not shown) and is threaded into a leg at 19 and clamping the idler cutter assembly securely in position.

Attached to the frame of the whole apparatus is a cylindrical mounting 20 within which there is a bellows 21 having folds 22. Bellows 21 is arranged within the cylindrical mounting 20 and is axially movable therein in a manner to be described below. In the drawing, at the lower end of the bellows 21, there is shown a wedge-like member 23 which is also axially movable within the cylindrical member 20 under the influence of bellows 21, and there is attached to member 23 a cylindrical guide 23' which serves to maintain member 23 in a proper axial orientation with respect to the bellows.

The support 14 is attached to the lower portion of the mounting 20 by flexible means 24 and 25. In the embodiment described herein, these flexible means are securely attached to the support 14 at 26 and 27 and to the mounting at 28 and 29. It will be noted that these flexible means lie in a plane which is generally diagonal both to the axis of the rotary cutter 12 and to the axis of the cylindrical mounting 20.

The upper portion 37 of the support 14 is shaped to conform to the bottom of the wedge-like member 23.

The axis of the idler cutter 12 is angled slightly in relation to the axes of the cylindrical cutter 10 to ensure that the contact of the cutters is at the ingoing nip.

Referring now to the bellows 21, it will be noted that the lower portion of the bellows 21 is attached to the wedge-like member 23 at 30. The upper portion of the bellows is attached to the top of the mounting 20 at 31. Both the upper and lower portions of the bellows are sealed to the upper portion of the mounting and the wedge-like member 23, respectively. There is provided an orifice 32 whereby air, or any suitable fluid, may be introduced under pressure to the inside of the bellows.

A compression spring 33 is mounted between a projection 34 extending from support 14, and the end portion 36 of bracket 35, the bracket 35 being attached to or forming part of the cylindrical mounting 20. The spring 33 biases the support 14 toward the bellows 21. the upper portion 37 of the support 14 contacting and bearing against the wedge-like member 23 under the influence of the spring 33.

Figure 2:
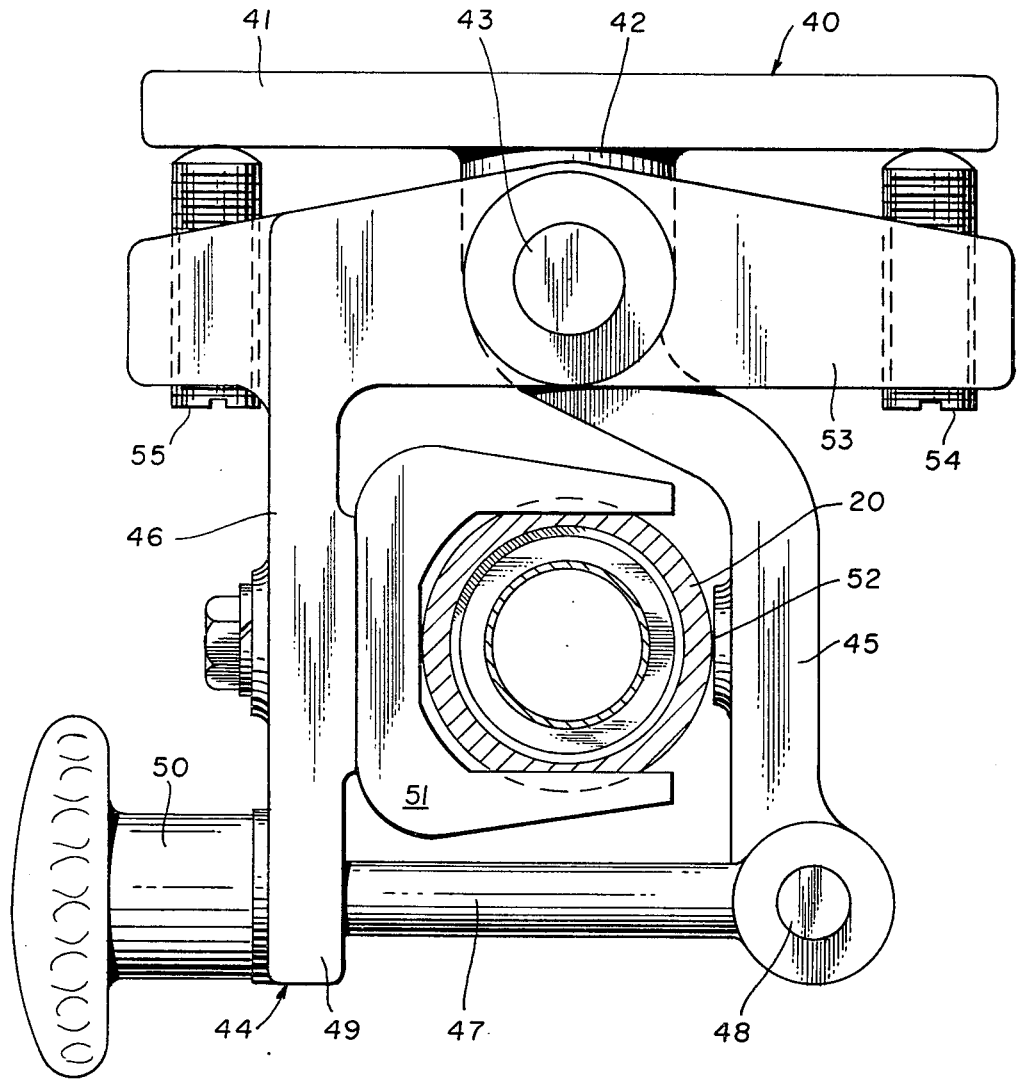
FIG. 2 is a cross-section on the lines 2—2 of FIG. 3 showing mounting means to hold the assembly shown in FIG. 1, to adjust the shear and the location of the nip.

In FIG. 2, there is shown a mounting for use with the above described apparatus, whereby adjustments can be made for nip location overlap and shear. The mounting, shown generally at 40, includes a mounting plate 41 which is adapted to be attached by fastening means (not shown) to a frame member (not shown). Extending from the centre of the plate 41 is a bracket 42 including a pivot 43. A clamp structure 44 including arms 45 and 46 is pivotally mounted on the pivot 43, the arms 45 and 46 being movable relative to each other about the pivot 43. A bolt 47 is pivotally attached to arm 45 at 48, and engages in a fork 49 on arm 46. Knurled nut 50 is threaded to the bolt 47, forming, with arms 45 and 46, the clamp structure 44 which may firmly hold the cylindrical mounting 20. Seats 51 and 52 are provided on arms 45 and 46, seat 51 having two parallel, flat surfaces matching similar surfaces machined on the cylindrical mounting 20 to positively locate the cylindrical mounting 20 against rotation relative to the clamp structure 44. The bolt holding seat 51 to arm 46 may be loosened, seat 51 rotated slightly, and the bolt retightened to adjust the location of the ingoing nip of the cutters.

Arm 46 is provided with an extension 53, which projects laterally to both sides of pivot 43. At each end of extension 53, set screws 54, 55 are threaded into the extension. These set screws are normally kept in engagement with plate 41 to prevent rotation of clamp structure 44 about pivot 43, while permitting limited adjustment of the clamp structure about pivot 43.

Figure 3:
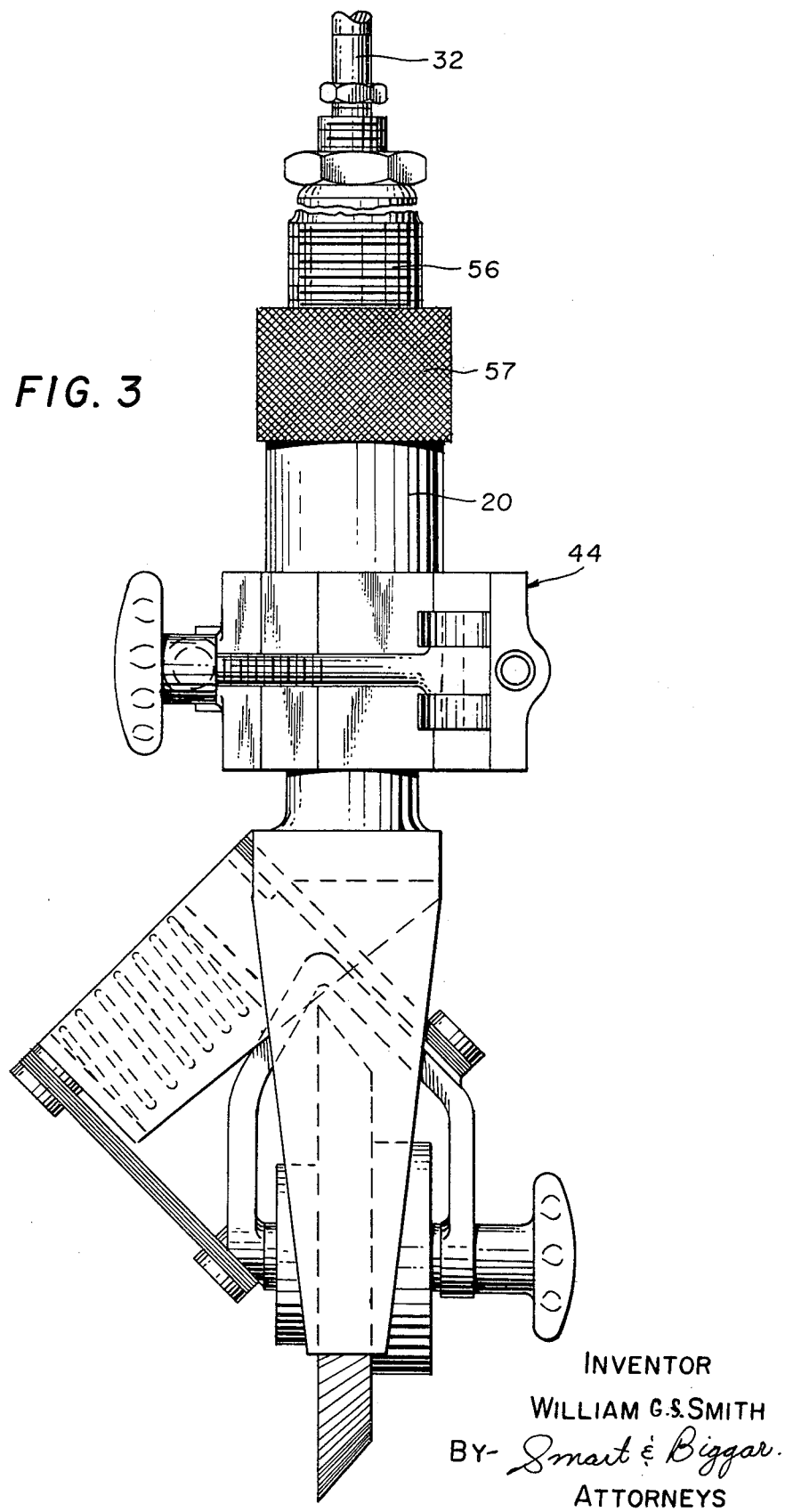
FIG. 3 is a front elevation showing a vertical adjusting means.

Referring to FIG. 3, cylindrical mounting 20 may be threaded externally, as at 56, and a knurled nut 57 may be threaded onto threads 56. Nut 57 when cylindrical mounting 20 is loosely held in clamp structure 44, may be used to effect fine vertical adjustment of the cylindrical mounting 20 and thus to adjust overlap of the rotary cutters.

The operation of the invention will now be described. When the cutters are in use, a constant preset pressure is maintained in bellows 21 to urge the fork-like support downwardly and laterally against spring 33, thus maintaining cutting edge 13 of the idler cutter 12 against the cutting edge 11 of cylindrical cutter 10. In order to thread a web of paper between the cutters, fluid pressure is released from the bellows 21 and the cutter 12 moves upwardly and laterally away from the cutter 10, allowing the threading to take place.

After a web of paper or the like, which it is desired to cut, has been introduced between the cylindrical cutter 10 and the disc cutter 12, air or any suitable fluid is forced under pressure through the orifice 32 into the bellows 21. The wedge-like member is moved downwardly, and acts upon the upper portion 37 of support 14 against the bias of the spring 33 and whatever resistance is present in the bellows 21 and flexible means 24 and 25. In relation to the drawings, the support moves downwardly and to the left. Further, the spring 33 is compresed. The cutting edge 13 of the cutting disc 12 then meets the cutting edge 11 of the cylindrical cutter 10, and the cylindrical cutter 10 may be driven to shear the paper passing between the two cutters. Regulation of the pressure supplied to bellows 21 will regulate the pressure of cutter 12 against cutter 10.

Referring now to the mounting structure 40 shown in FIG. 2, when the apparatus according to the invention is first installed on paper-making machinery, it is necessary to set the overlap of the rotary cutters, the location of the ingoing nip and the shear. With the embodiment illustrated, the pre-setting of the mounting is as follows. After the cylindrical slitter is fixed in the desired location and the mounting plate 41 is attached to the frame (not shown), clamp 44 is loosened to allow cylindrical mounting 20 to be moved vertically within seats 51, 52. Pressure is admitted into bellows 21 extending it and moving the idler cutter 12 downward. The assembly is moved along the winder rail (not shown) until the edges of the idler cutter is above but slightly aside of the cylindrical cutter. Nut 57 is adjusted to bring the idler cutter edge 13 well below the edge 11 of cutter 10. The assembly is moved sideways until the cutting edges come into contact, and the mounting plate 41 is secured to the winder rail. Shear is set at zero by means of set screws 54 and 55 and overlap is set by means of nut 57. The location of the ingoing nip of the cutters is adjusted by loosening the holding bolt of seat 51, rotating the seat and retightening the bolt. The shear is then set accurately using screws 54 and 55, the nut 50 is tightened, the contact between the cutting edges is checked and the pressure to the bellows is increased to give the required side loading. Normally if the bottom slitter motor rails are accurate and clean, there will be no further need of shear adjustment. Overlap will need adjusting occasionally to compensate for slitter wear, and since this can be done without upsetting other adjustments, no cutter damage will result.

With regard to the flexible material used for the flexible means 24 and 25 any suitable relatively stiff material, such as synthetics, and the like, may be used. Further, in place of flexible members there may be used a set of linkages pivoted at 28, 29, 26 and 27. Means other than bellows may be used for urging the wedge-like member toward the arbor, for example, an air cylinder assembly may be used.

Further with regard to the inclined surfaces on wedge-like member 23 and projection 37, their inclination in such that friction between 37 and the base of mounting 20, and between the inclined faces locks the idler cutter mounting 14 in position and ensures positive contact between the two cutters.

What I claim as my invention is:

1. Rotary shear cutters comprising: first and second cutters rotatable on parallel axes and having cutting edges, said cutters overlapping at their cutting edges to define a shear area, a frame mounting said cutters, and apparatus for adjusting said cutters relative to each other, said apparatus including a movable support for said first cutter, means mounting said support to said frame, said means including two flexible members each having two ends, one end of each member being attached to the frame and the the other end of each member being attached to the support, said members lying on spaced planes diagonally intersecting the axes of the cutters, and means for moving said support relative to said frame, whereby said first cutter may be moved simultaneously axially and radially toward and away from said second cutter.

2. The apparatus defined in claim 1 wherein said planes are substantially parallel and intersect said axes at approximately 45°.

3. The apparatus defined in claim 1 further including a spring between said support and said frame, said spring being biased to urge said cutters away from each other.

4. The apparatus defined in claim 3 wherein said means for moving said support act against the bias of said spring, whereby the cutters are moved toward each other.

5. The apparatus defined in claim 4 wherein said means for moving said support is a fluid actuated bellows.

References Cited

UNITED STATES PATENTS

| | | | |
|---|---|---|---|
| 3,041,907 | 7/1962 | Gallagher | 83—502 X |
| 3,186,281 | 6/1965 | Wingen | 83—501 X |
| 3,380,330 | 4/1968 | Gilmore | 83—503 X |

FOREIGN PATENTS 1,179,099  10/1964  Germany.

ANDREW R. JUHASZ, Primary Examiner

J. F. COAN, Assistant Examiner

U.S. Cl. X.R.

83—502